United States Patent
Masters

(10) Patent No.: US 10,505,730 B2
(45) Date of Patent: Dec. 10, 2019

(54) SECURE DATA MANAGEMENT

(71) Applicant: Red Hat, Inc., Raleigh, NC (US)

(72) Inventor: Jonathan Charles Masters, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 278 days.

(21) Appl. No.: 15/425,274

(22) Filed: Feb. 6, 2017

(65) Prior Publication Data

US 2018/0225225 A1 Aug. 9, 2018

(51) Int. Cl.
*H04L 9/08* (2006.01)
*G06F 21/62* (2013.01)

(52) U.S. Cl.
CPC ........ *H04L 9/0894* (2013.01); *G06F 21/6209* (2013.01); *G06F 21/6218* (2013.01); *H04L 9/08* (2013.01)

(58) Field of Classification Search
CPC .............. G06F 12/1408; G06F 12/14; G06F 21/60–629; G06F 21/10; G06F 21/51; H04L 9/14; H04L 9/30; H04L 63/08–0892
See application file for complete search history.

(56) References Cited

U.S. PATENT DOCUMENTS

| | | | |
|---|---|---|---|
| 8,738,932 B2 | 5/2014 | Lee et al. | |
| 8,903,093 B2 * | 12/2014 | Kim | H04W 12/02 380/270 |
| 9,215,250 B2 | 12/2015 | Porten et al. | |
| 2006/0143417 A1 | 6/2006 | Poisner et al. | |
| 2014/0337628 A1 * | 11/2014 | Amato | H04L 9/0825 713/171 |
| 2015/0089244 A1 * | 3/2015 | Roth | G06F 21/6209 713/193 |
| 2015/0256332 A1 * | 9/2015 | Raj | H04L 67/1095 713/150 |
| 2015/0326547 A1 * | 11/2015 | Carlson | H04L 63/061 713/171 |

(Continued)

FOREIGN PATENT DOCUMENTS

WO  WO 2015094176 A1  6/2015

OTHER PUBLICATIONS

Intel, "Intel Cloud Builders Guide: Cloud Design and Deployment on Intel Platforms," 2011.

*Primary Examiner* — Khalil Naghdali
*Assistant Examiner* — Shaqueal D Wade
(74) *Attorney, Agent, or Firm* — Kilpatrick Townsend & Stockton LLP

(57) ABSTRACT

A computing device can securely and selectively enable a remote computing device to decrypt encrypted data that is stored remotely (e.g., within a cloud-computing environment). For example, the computing device can transmit an encrypted communication to a processing device of the remote computing device. The encrypted communication can include a first key for decrypting the encrypted data. The processing device can receive the encrypted communication and use a second key that is stored in an internal memory of the processing device to decrypt the encrypted communication. The processing device can extract the first key from the decrypted version of the encrypted communication. The processing device can then use the first key to decrypt the encrypted data.

21 Claims, 5 Drawing Sheets

---

202
Decrypt an encrypted communication from a remote device using a first key stored in an internal memory of a processing device to generate a decrypted version of the encrypted communication

↓

204
Extract from the decrypted version of the encrypted communication a second key that is different from the first key and usable to decrypt encrypted data stored in a non-volatile memory device

(56) References Cited

U.S. PATENT DOCUMENTS

2016/0191235 A1* 6/2016 Kim .................. G06F 3/0622
  713/193
2018/0004559 A1* 1/2018 Geml ................ G06F 9/45558
2018/0081554 A1* 3/2018 Iyer .................... G11C 5/04

* cited by examiner

SECURE DATA MANAGEMENT

TECHNICAL FIELD

The present disclosure relates generally to information security. More specifically, but not by way of limitation, this disclosure relates to securely storing and managing data.

BACKGROUND

Users are increasingly turning to cloud-service providers to provide the technical infrastructure for various computing tasks. For example, users can purchase access to data storage space, processing power, virtual machines, software applications, and other services provided by cloud-service providers, without having to maintain and secure a technical infrastructure of their own. This can significantly reduce the burdens and costs on such users.

DETAILED DESCRIPTION

Figure 1:
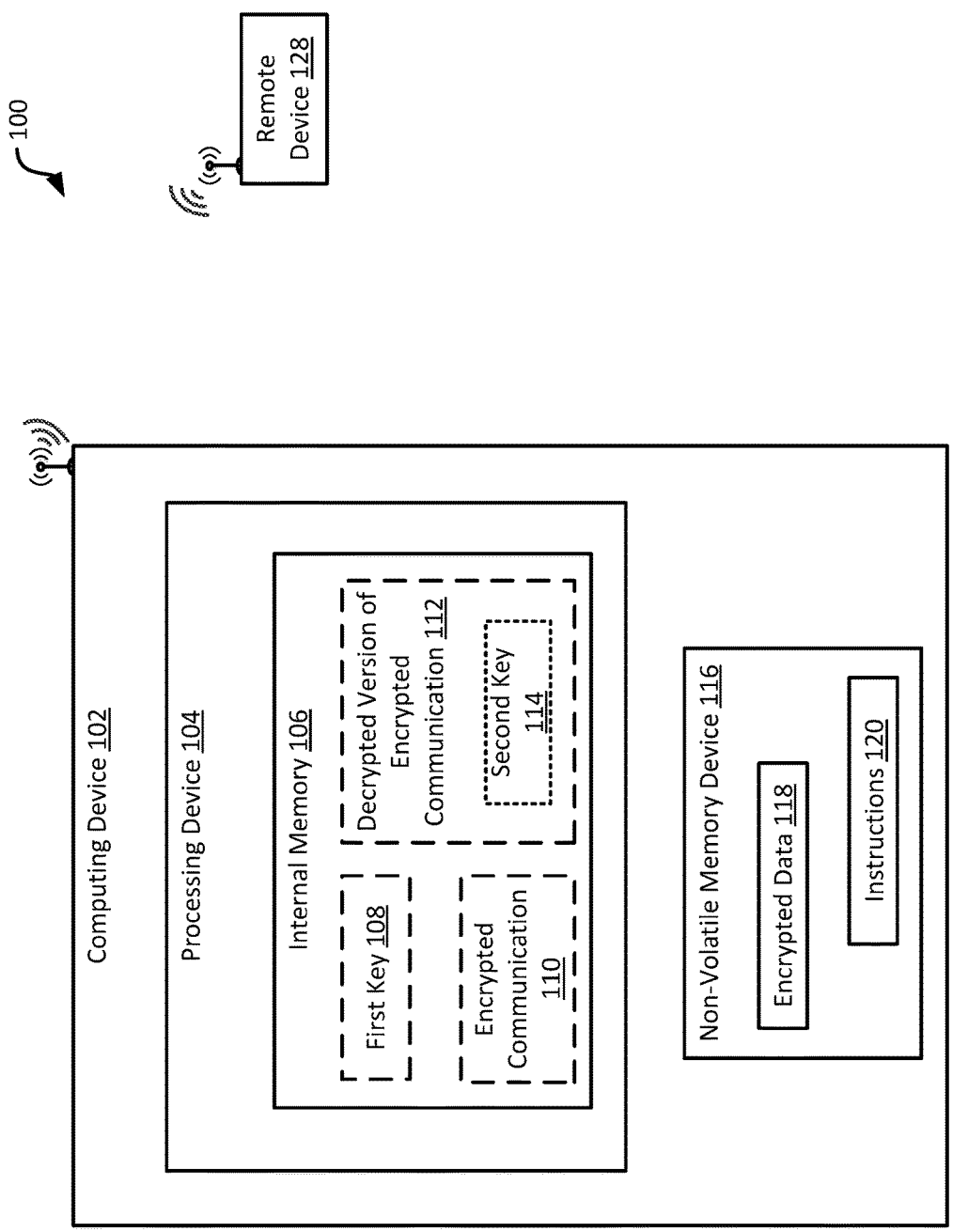
FIG. 1 is a block diagram of an example of a system for managing data securely according to some aspects.

There can be disadvantages to using cloud-service providers to store data and perform tasks. For example, cloud-service providers may access, analyze, or share the data stored in their infrastructure, raising security and privacy concerns, especially if the data is confidential. And some cloud-service providers provide a poor level of security, making such data vulnerable to external attacks by hackers.

Some examples of the present disclosure overcome the abovementioned issues by providing a two-key encryption system that can significantly increase the level of security with which data is stored and managed by a cloud-service provider. For example, a user can store data in an encrypted format with the cloud-service provider. The user can securely and remotely enable the cloud-service provider to decrypt the encrypted data by transmitting, to the cloud-service provider, an encrypted communication that has a first key for decrypting the encrypted data. The cloud-service provider can receive the encrypted communication, decrypt the encrypted communication using a second key, and obtain the first key. The cloud-service provider can then use the first key to decrypt the data.

More specifically, in some examples, a user can store data with the cloud-service provider in an encrypted format for which the user, and not the cloud-service provider, has a decryption key. This decryption key can be referred to as a data-decryption key. Storing the data in the encrypted format can prevent an unauthorized user from accessing the data. If the user wishes to enable a particular server of the cloud-service provider to use the data (e.g., to execute a software application that uses the data), the user can cause the data-decryption key to be transmitted to the server in an encrypted communication. Transmitting the data-decryption key in an encrypted communication can prevent an unauthorized user from intercepting the communication and obtaining the data-decryption key. A processing device within the server can receive the encrypted communication. The processing device can use a communication-decryption key to decrypt the encrypted communication. The communication-decryption key can be stored in a memory device that is internal to the processing device. The processing device can then obtain and use the data-decryption key to decrypt the encrypted data. Some or all of the abovementioned features can provide and end-to-end encryption scheme in which a user can selectively provide access to the encrypted data, via secure communications, while ensuring that the data-decryption key is not permanently stored within the infrastructure of the cloud-service provider.

In some examples, the processing device can store the data-decryption key in a volatile memory device, such as a random access memory (RAM) device, for later use. The processing device can then use the data-decryption key to decrypt the data at a later time, or enable a software application to use the data-decryption key to decrypt the data. If power to the volatile memory device is lost (e.g., the server is shutdown), the data-decryption key is automatically erased from the volatile memory device. Additionally or alternatively, the user can cause a command to be transmitted to the processing device for causing the processing device to erase the data-decryption key from the volatile memory device. Some or all of the abovementioned features can further ensure that the data-decryption key is not permanently stored within the infrastructure of the cloud-service provider.

Also, some examples of the present disclosure can enable the data-decryption key to be provided to the processing device prior to the processing device performing an operation (or while the processing device is performing the operation). Examples of the operation can include booting up, provisioning a virtual machine, executing a software application, or any combination of these. For example, the processing device may rely on certain data to perform the operation. The data can include a configuration file, an executable file, a filesystem or file system, a directory, or any combination of these. But the data can be stored in an encrypted format (e.g., for enhanced security, as discussed above), rendering the data unusable by the processing device without the data-decryption key. Some examples of the present disclosure can enable the data-decryption key to be provided to the processing device from a remote device via a secure, encrypted communication prior to the processing device performing the operation (or while the processing device is performing the operation). This can enable the processing device to access the data and successfully perform the operation, without the data-decryption key being permanently stored within the infrastructure of the cloud-service provider.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing data securely according to some aspects. The system 100 includes a computing device 102. In some examples, the computing device 102 can be part of a cloud-computing environment. The computing device 102 can be in communication with a remote device 128 via the Internet, a local area network (LAN), a wide area network (WAN), or any combination of these. The computing device 102 and remote device 128 can communicate with one another via one or more wired or wireless interfaces, such as a serial interface, an IEEE 802.11 interface, a Bluetooth interface, or any combination of these.

The computing device 102 includes a processing device 104. The processing device 104 can include one processing device or multiple processing devices. Non-limiting examples of the processing device 104 include a Field-Programmable Gate Array ("FPGA"), an application-specific integrated circuit ("ASIC"), a microprocessor, etc. The processing device 104 can execute instructions 120 stored in an internal memory 106 or an external memory, such as a non-volatile memory device 116, to perform operations.

The internal memory 106 can be housed within or otherwise integrated with the processing device 104. The internal memory 106 can include one or more of the features discussed below with respect to the non-volatile memory device 116. In some examples, the internal memory 106 can include a decryption key, which can be referred to as a first key 108, for decrypting an encrypted communication 110 from the remote device 128. The first key 108 may have been preprogrammed or hardcoded into the internal memory 106 by a manufacturer or distributor of the processing device 104. By including the first key 108 in an internal memory 106 of the processing device 104, an unauthorized user that has physical access to the computing device 102 and is monitoring internal communications between the hardware components of the computing device 102 may be unable to access the first key 108.

The processing device 104 can be communicatively coupled to the non-volatile memory device 116. The non-volatile memory device 116 may include any type of memory device that retains stored information when powered off. One example of the non-volatile memory device 116 includes a persistent memory device. Other examples of the non-volatile memory device 116 include electrically erasable and programmable read-only memory ("EEPROM"), flash memory, or any other type of non-volatile memory. In some examples, at least some of the non-volatile memory device 116 can include a computer-readable medium from which the processing device 104 can read instructions 120. The computer-readable medium can include electronic, optical, magnetic, or other storage devices capable of providing the processing device 104 with the instructions 120 or other program code. In some examples, the computer-readable medium include magnetic disk(s), memory chip(s), ROM, random-access memory ("RAM"), an ASIC, a configured processor, optical storage, or any other medium from which the processing device 104 can read the instructions 120. The instructions 120 can include processor-specific instructions generated by a compiler or an interpreter from code written in any suitable computer-programming language, including, for example, C, C++, C#, etc.

The non-volatile memory device 116 can include encrypted data 118. The encrypted data 118 can be encrypted using one or more encryption techniques. In some examples, the remote device 128 can encrypt data and communicate the encrypted data 118 to the computing device 102. The computing device 102 can receive the encrypted data 118 and store the encrypted data 118 in the non-volatile memory device 116.

The remote device 128 can remotely, securely, and selectively enable the computing device 102 to decrypt the encrypted data 118. For example, the remote device 128 can transmit an encrypted communication 110 to the processing device 104. The encrypted communication 110 can include a second key 114 for decrypting the encrypted data 118. The processing device 104 can receive the encrypted communication 110, use the first key 108 to generate a decrypted version of the encrypted communication 112, and extract the second key 114 from the decrypted version of the encrypted communication 112. The processing device 104 can then use the second key 114 to decrypt the encrypted data 118.

In some examples, the encrypted data 118 can be encrypted using multiple encryption techniques. For example, different portions of the encrypted data 118 can be encrypted using different encryption techniques, or the encrypted data 118 can be encrypted using multiple encryption techniques sequentially. The remote device 128 can transmit an encrypted communication 110 that includes multiple decryption keys, data about how to decrypt the encrypted data 118 (e.g., an order in which to apply the multiple decryption keys or portions of the encrypted data 118 to which to apply the different decryption keys), or both of these to the processing device 104. The processing device 104 can receive the encrypted communication 110, use the first key 108 to generate a decrypted version of the encrypted communication 112, and extract the multiple keys and other data from the decrypted version of the encrypted communication 112. The processing device 104 can then apply the keys as indicated in the data to decrypt the encrypted data 118.

In some examples, the remote device 128 can transmit a command to the computing device 102 via the encrypted communication 110. For example, the encrypted communication 110 can include the command additionally or alternatively to the second key 114. The command can be for causing the processing device 104 to perform one or more operations. For example, the command can cause the processing device 104 to copy, erase, duplicate, or otherwise manage data stored in the internal memory 106, the non-volatile memory device 116, or both of these. As another example, the command can cause the processing device to boot up, provision a virtual machine, execute a software application, or any combination of these. The processing device 104 can use the first key 108 to generate the decrypted version of the encrypted communication 112. The processing device 104 can determine the command, the second key 114, or both of these based on the decrypted version of the encrypted communication 112. The processing device 104 can then perform the one or more operations based on the command.

Figure 2:
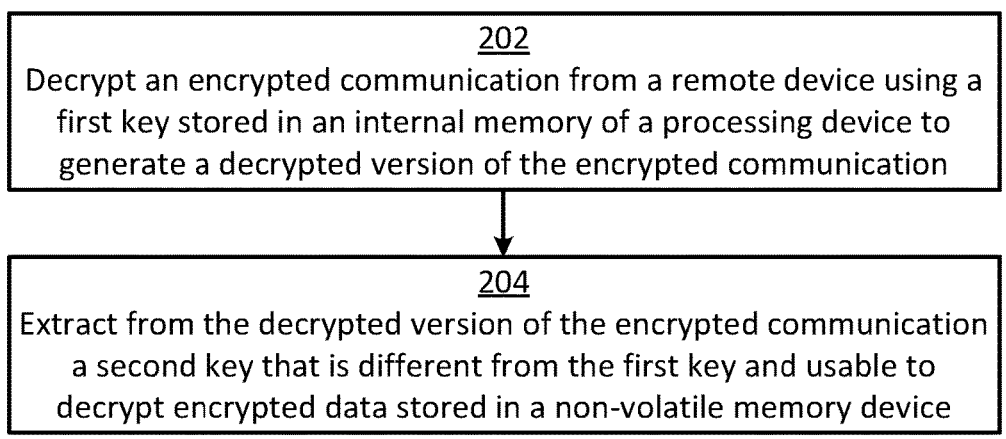
FIG. 2 is a flow chart showing an example of a process for using a processing device to manage data securely according to some aspects.

FIG. 2 is a flow chart showing an example of a process for using a processing device to manage data securely according to some aspects. Some examples can include more, fewer, or different steps than the steps depicted in FIG. 2. The steps below are described with reference to components described above with regard to FIG. 1.

In block 202, the processing device 104 decrypts an encrypted communication 110 from a remote device 128 using a first key 108 stored in an internal memory 106 of the processing device 104 to generate a decrypted version of the encrypted communication 112.

For example, the processing device 104 can receive the encrypted communication 110 via a communication pathway between the processing device 104 and the remote device 128. The communication pathway can be a secure communication pathway in which communications between the processing device 104 and the remote device 128 are encrypted. In some examples, communications between the processing device 104 and the remote device 128 can be encrypted using a public key, and the first key 108 can be a private key associated with the public key. The processing device 104 can obtain the first key 108 from the internal memory 106 and use the first key 108 to decrypt the encrypted communication 110. In some examples, the processing device 104 can obtain multiple keys from the internal memory 106 and use the multiple keys (e.g., sequentially or according to another predetermined order) to decrypt the encrypted communication 110. The processing device 104 can then store the decrypted version of the encrypted communication 112 in the internal memory 106.

In block 204, the processing device 104 extracts, from the decrypted version of the encrypted communication 112, a second key 114 that is different from the first key 108 and usable to decrypt encrypted data 118 stored in a non-volatile memory device 116.

In some examples, the processing device 104 can analyze the decrypted version of the encrypted communication 112 to determine the second key 114. For example, the processing device 104 can analyze header information, footer information, metadata, or any combination of these associated with the decrypted version of the encrypted communication 112 to determine the second key 114. As another example, the second key 114 can be included in a predetermined portion (e.g., in a particular line or section) of the decrypted version of the encrypted communication 112. The processing device 104 can analyze the predetermined portion to determine the second key 114.

Figure 3:
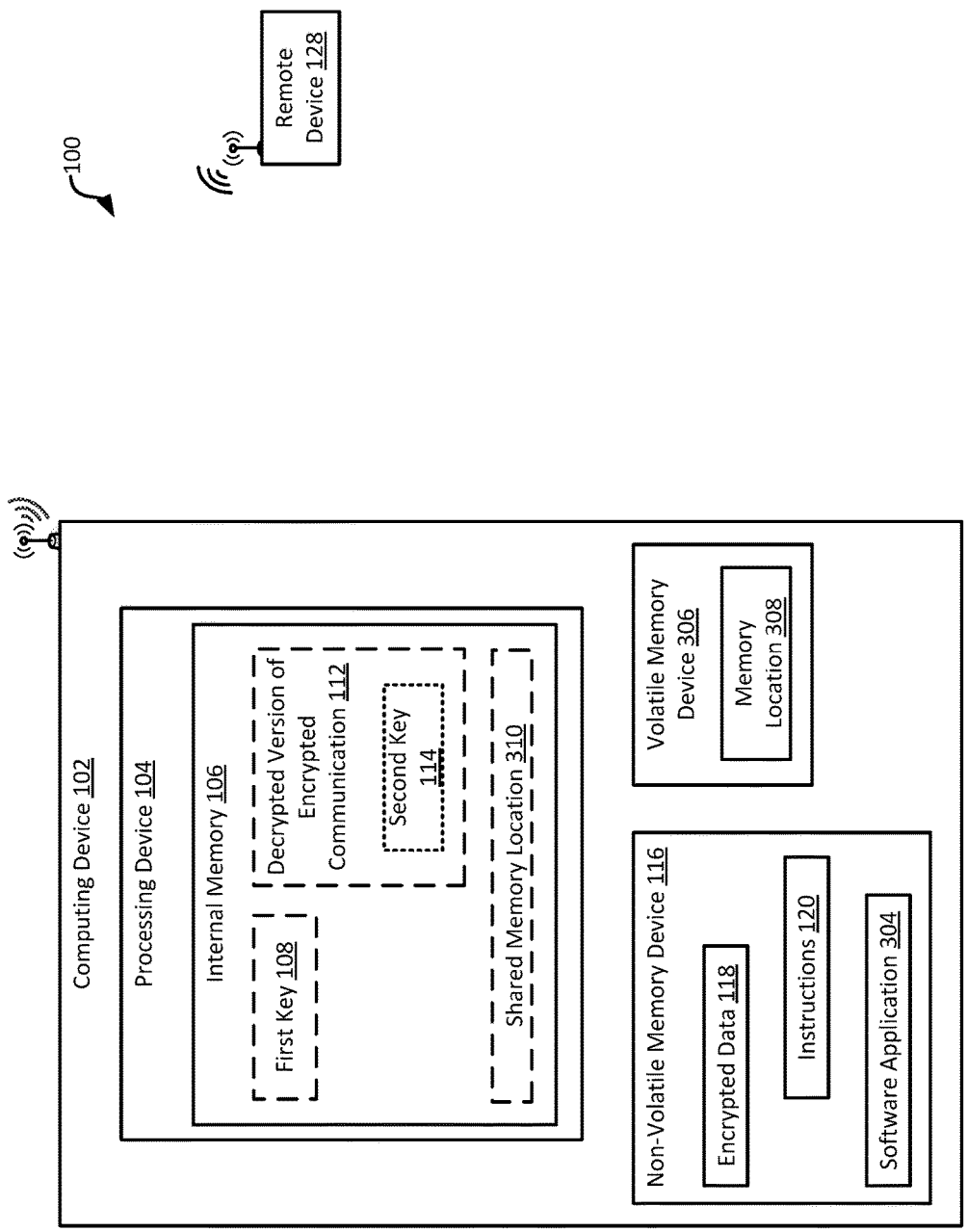
FIG. 3 is a block diagram of another example of the system of FIG. 1 for managing data securely according to some aspects.

FIG. 3 is a block diagram of another example of the system 100 of FIG. 1 for managing data securely according to some aspects. In some examples, the computing device 102 can execute a software application 304 (e.g., stored in the non-volatile memory device 116). In one example, the software application 304 can include a hypervisor, which can sometimes be referred to as a virtual-machine manager. A hypervisor can manage multiple instances of an operating system (e.g., a Windows™' OS X, or Linux-based operating system), such as by provisioning and managing virtual machines that run individual instances of the operating system. The hypervisor can allocate processing power, memory, and other resources of the computing device 102 among the instances of the operating system (e.g., among the virtual machines). In other examples, the software application 304 can include another type of applications.

In some examples, the software application 304 can act as an intermediary between the processing device 104 and the remote device 128. For example, the remote device 128 can transmit an encrypted communication to the computing device 102. The software application 304 can include program code for receiving the encrypted communication and analyzing the encrypted communication to ensure the encrypted communication satisfies one or more predefined criteria. If so, the software application 304 can enable the processing device 104 to access the encrypted communication (e.g., to decrypt it). If the encrypted communication does not meet the one or more predefined criteria, the software application 304 can cause the encrypted communication to be discarded. In some examples, this authentication process can provide an additional layer of security that can prevent an unauthorized user from accessing the encrypted data 118. An example of such an authentication process is described in greater detail with respect to FIGS. 4-5.

Figure 4:
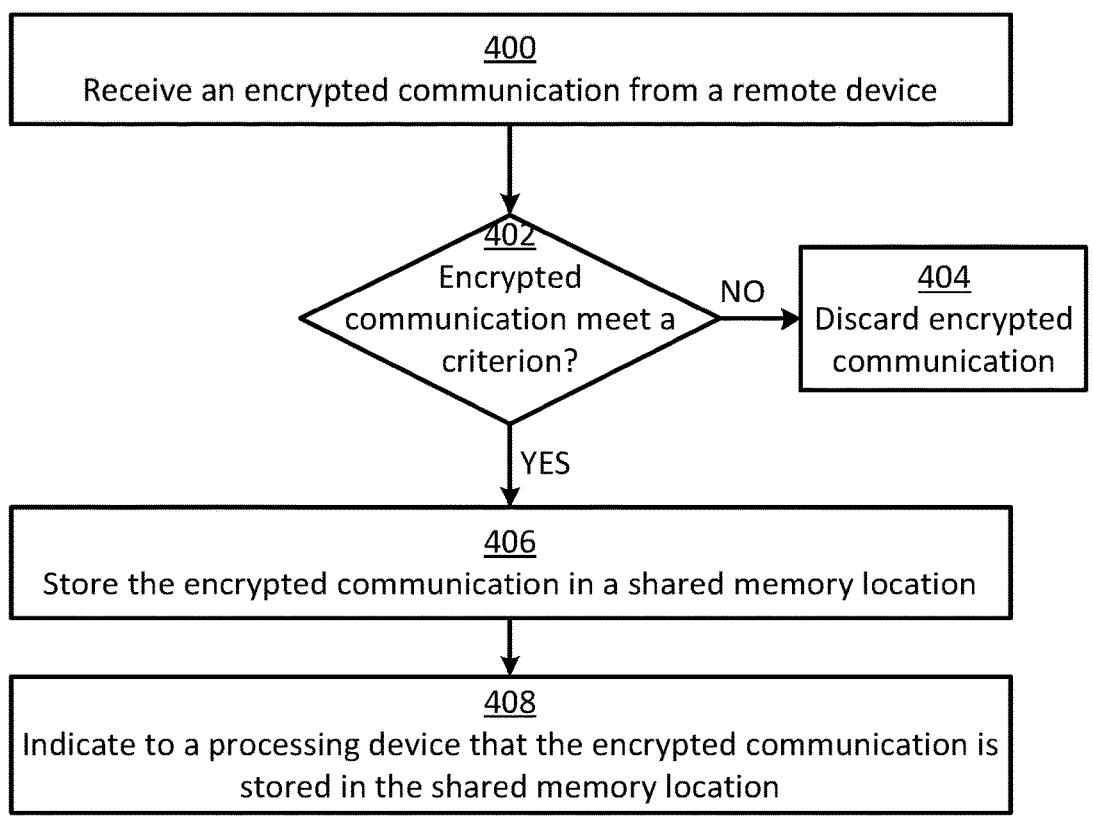
FIG. 4 is a flow chart showing an example of a process for authenticating an encrypted communication according to some aspects.

FIG. 4 is a flow chart showing an example of a process for authenticating an encrypted communication according to some aspects. Some examples can include more, fewer, or different steps than the steps depicted in FIG. 4. The steps below are described with reference to components described above with regard to FIG. 3.

In block 400, a software application 304 receives an encrypted communication from a remote device 128. For example, the software application 304 can include program code for receiving the encrypted communication. The program code of the software application 304 can be executed by the processing device 104 to cause the processing device 104 to perform one or more operations, such as for causing the processing device 104 to receive the encrypted communication.

In block 402, the software application 304 determines if the encrypted communication satisfies a predefined criterion. For example, the software application 304 can include program code for analyzing the encrypted communication to determine if the encrypted communication conforms to a predefined format (e.g., has a predefined number of lines, a predefined sequence of lines, a predefined sequence of characters, a predefined header or footer, or any combination of these). Additionally or alternatively, the software application 304 can include program code for analyzing the encrypted communication to determine if the encrypted communication includes one or more predefined characters (e.g., a checksum).

In some examples, the software application 304 can include program code for determining if the encrypted communication was transmitted by a trusted source, such as the remote device 128. For example, the software application 304 can include program code for comparing an internet protocol (IP) address of the source of the encrypted communication to a list of trusted IP addresses to determine if the IP address is associated with a trusted source. Additionally or alternatively, the software application 304 can include program code for analyzing a digital certificate associated with the source of the encrypted communication to determine if the source of the encrypted communication is a trusted source. The source of the encrypted communication can provide the digital certificate, or a location (e.g., a hyperlink) for obtaining the digital certificate, via the encrypted communication or a separate communication. Additionally or alternatively, the software application 304 can include program code for comparing a password or passphrase provided by the source of the encrypted communication to a known password or passphrase to determine if the source of the encrypted communication is a trusted source. The source of the encrypted communication can provide the password or passphrase via the encrypted communication or a separate communication.

The software application 304 can determine if the encrypted communication satisfies any number and combination of criteria using any number and combination of methods. If the encrypted communication does not meet the criteria, the process can proceed to block 404 and the encrypted communication can be discarded. For example, the software application 304 can include program code for causing the encrypted communication to be discarded. Otherwise, the process can continue to block 406.

In block 406, the software application 304 stores the encrypted communication in a shared memory location 310. For example, the software application 304 can include program code for storing the encrypted communication in the shared memory location 310. In some examples, the shared memory location 310 can include a memory location that is accessible by the processing device 104 and allocated to the software application 304, so that both the software application 304 and the processing device 104 may use the shared memory location 310. In other examples, the shared memory location 310 can be a memory location that is only accessible by the processing device 104 if the software application 304 indicates that the processing device 104 is allowed to access the shared memory location 310. In such an example, the software application 304 can include one or more rules that control or otherwise dictate access to the shared memory location 310. Although the shared memory location 310 is indicated in FIG. 3 as being within the internal memory 106 of the processing device 104, in other examples the shared memory location 310 can be in another memory device, such as the non-volatile memory device 116 or the volatile memory device 306.

In some examples, the software application 304 can indicate that the encrypted communication has been authenticated. For example, the software application 304 can cause a flag to be set (e.g., in a memory location) indicating that the encrypted communication has been authenticated. As another example, the software application 304 can store a modified version of the encrypted communication (e.g., rather than the encrypted communication itself) in the shared memory location 310. For example, the software application 304 can include program code for digitally signing the encrypted communication, tagging the encrypted communication, including metadata in the encrypted communication, or otherwise modifying the encrypted communication. The modified version of the encrypted communication can indicate that the encrypted communication has been authenticated by the software application 304. The software application 304 can then cause the modified version of the encrypted communication to be stored in the shared memory location 310.

In block 408, the software application 304 indicates to the processing device 104 that the encrypted communication (e.g., or a modified version of the encrypted communication) is stored in the shared memory location 310. For example, the processing device 104 may repeatedly check a memory location (e.g., within the internal memory 106, the non-volatile memory device 116, or the volatile memory device 306) for a particular flag indicating that the encrypted communication is stored in the shared memory location 310. The software application 304 can cause the particular flag to be set. As another example, the processing device 104 may repeatedly check the shared memory location 310 for data. And storing the encrypted communication in the shared memory location 310 can automatically act as the indicator for the processing device 104. As another example, the software application 304 can include program code for causing a communication to be transmitted to the processing device 104 indicating that the encrypted communication in stored in the shared memory location 310. The software application 304 can use any number and combination of methods to indicate to the processing device 104 that the encrypted communication in stored in the shared memory location 310.

Although the above steps are described as being performed by the software application 304, some or all of the steps can additionally or alternatively be performed by the processing device 104. For example, the processing device 104 can receive the encrypted communication, as discussed with respect to block 400. As another example, the processing device 104 can authenticate the encrypted communication using any combination of the methods described with respect to block 402. If the encrypted communication does not meet one or more criteria, the processing device 104 can discard the encrypted communication (e.g., as discussed with respect to block 404).

Figure 5:
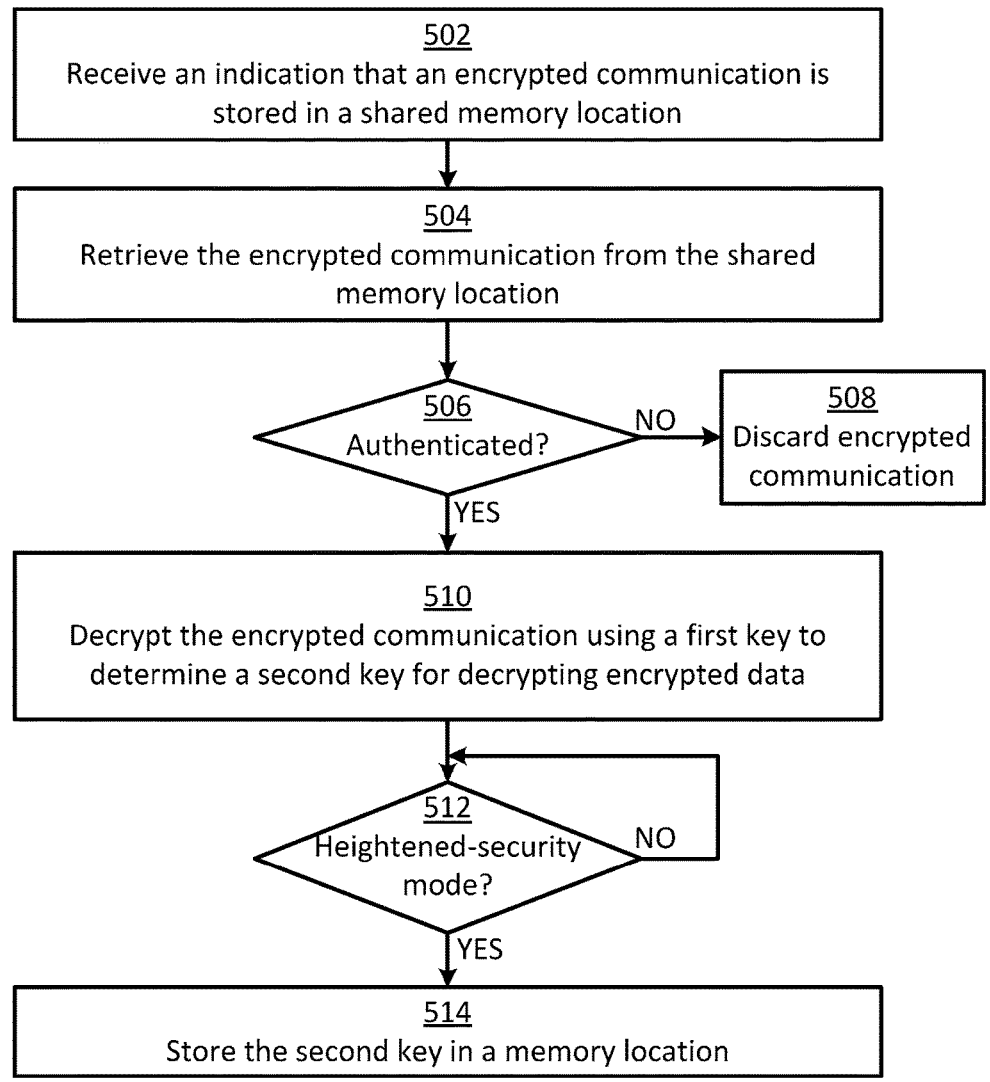
FIG. 5 is a flow chart showing an example of a process for using an encrypted communication that has been authenticated according to some aspects.

FIG. 5 is a flow chart showing an example of a process for using an encrypted communication that has been authenticated according to some aspects. Some examples can include more, fewer, or different steps than the steps depicted in FIG. 4. The steps below are described with reference to components described above with regard to FIG. 3.

In block 502, the processing device 104 receives an indication that an encrypted communication is stored in a shared memory location 310. For example, the processing device 104 can determine that a particular flag is set (e.g., in a memory location) indicating that the encrypted communication is stored in the shared memory location 310. Additionally or alternatively, the processing device 104 can monitor the shared memory location 310 for data and determine when the encrypted communication is stored in the shared memory location 310. Additionally or alternatively, the processing device 104 can receive a communication (e.g., from software application 304) indicating that the encrypted communication in stored in the shared memory location 310.

In block 504, the processing device 104 retrieves the encrypted communication from the shared memory location 310. For example, the processing device 104 can access the shared memory location 310 and obtain the encrypted communication from the shared memory location 310.

In block 506, the processing device 104 determines if the encrypted communication has been authenticated (e.g., via the software application 304). For example, the processing device 104 can determine if the encrypted communication has been digitally signed, includes a tag or metadata indicating that the encrypted communication has been authenticated, or otherwise indicates that the encrypted communication has been authenticated. Additionally or alternatively, the processing device 104 can check a memory location for a flag indicating that the encrypted communication has been authenticated. If the processing device 104 determines that the encrypted communication has not been authenticated, the process can continue to block 508 where the processing device 104 can discard the encrypted communication. Otherwise, the process can continue to block 510.

In block 510, the processing device 104 decrypts the encrypted communication using a first key 108 to determine a second key 114 for decrypting encrypted data 118. In some examples, the processing device 104 can use any of the methods discussed with respect to block 202 of FIG. 2 to decrypt the encrypted communication.

In block 512, the processing device 104 determines if the computing device 102 (e.g., the processing device 104, the non-volatile memory device 116, the volatile memory device 306, a software application 304, or any combination of these) is operating in a heightened-security mode. The heightened-security mode can include a mode of operation that provides a higher level of security (e.g., against unauthorized access to data) than a normal mode of operation. For example, the heightened-security mode can include the processing device 104 implementing an encrypted memory scheme in which the processing devices 104 encrypts data in one or more memory locations in the volatile memory device 306, the non-volatile memory device 116, or both of these. As another example, the heightened-security mode can include the volatile memory device 306 or the non-volatile memory device 116 requiring the processing device 104 to provide a password or otherwise be authenticated for access.

If the processing device 104 determines that the computing device 102 is operating in a heightened-security mode, the process can continue to block 514. Otherwise, the processing device 104 can wait until the computing device 102 enters the heightened-security mode before proceeding. In some examples, determining that the computing device 102 is operating in a heightened-security mode before proceeding to block 514 can provide an extra layer of security (e.g., to ensure that the second key 114 is not stored for later use by the processing device 104 in a human-readable or unencrypted format).

In block 514, the processing device 104 stores the second key 114 in a memory location 308. In some examples, the memory location 308 can be within a volatile memory device 306. This can enable the processing device 104 to use the second key 114 to decrypt the encrypted data 118 until power to the volatile memory device 306 is lost (e.g., the computing device 102 is shutdown), at which point the second key 114 can automatically erased from the volatile memory device 306. Although the volatile memory device 306 is shown in FIG. 3 is being external to the processing device 104, in other examples the volatile memory device 306 can be internal to the processing device 104 (e.g., within the internal memory 106, or within the processing device 104 but separate from the internal memory 106). In other examples, the processing device 104 can store the second key 114 in the non-volatile memory device 116.

In some examples, the memory location 308 can be accessible by firmware or by a software application, such as software application 304, a virtual machine, an operating system, or any combination of these. This can enable the software application to use the second key 114 to decrypt the encrypted data 118. For example, the processing device 104 can store the second key 114 in a memory location 308 that is allocated to a virtual machine (e.g., made available to the virtual machine so that the virtual machine can use the memory location 308). Then, the virtual machine can access the memory location 308, retrieve the second key 114, and decrypt at least a portion of the encrypted data 118.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device that includes an internal memory comprising a first key; and
a memory device on which instructions executable by the processing device are stored for causing the processing device to:
store encrypted data on a non-volatile memory device; and
subsequent to storing the encrypted data on the non-volatile memory device:
receive an encrypted communication from a remote device;
decrypt the encrypted communication using the first key stored in the internal memory of the processing device to generate a decrypted version of the encrypted communication;
extract, from the decrypted version of the encrypted communication, a second key that is different from the first key; and
decrypt the encrypted data stored on the non-volatile memory device using the second key.

2. The system of claim 1, wherein the non-volatile memory device is a persistent memory device, the first key is a private key, and the encrypted communication is encrypted using a public key associated with the private key.

3. The system of claim 1, wherein the non-volatile memory device includes the memory device.

4. The system of claim 1, wherein the memory device further comprises instructions that are executable by the processing device for causing the processing device to:
store the second key in a memory location that is accessible by a software application; and
cause the software application to use the second key to decrypt the encrypted data.

5. The system of claim 1, wherein the memory device further comprises instructions that are executable by the processing device for causing the processing device to:
determine if the processing device is in an operational mode associated with encrypting a memory location in a volatile memory device;
based on determining that the processing device is in the operational mode, store the second key in the memory location in an encrypted format; and
based on determining that the processing device is not in the operational mode, wait until the processing device has entered the operational mode to store the second key in the memory location.

6. The system of claim 1, wherein the memory device further comprises instructions that are executable by the processing device for causing the processing device to use a hypervisor application to:
receive the encrypted communication from the remote device over the Internet;
determine if the encrypted communication satisfies a predefined criterion;
based on determining that the encrypted communication satisfies the predefined criterion:
cause the encrypted communication to be stored in a memory location that is accessible by the processing device and the hypervisor application; and
indicate to the processing device that the encrypted communication is stored in the memory location; and
based on determining that the encrypted communication does not meet the predefined criterion, discard the encrypted communication.

7. The system of claim 6, wherein the memory device further comprises instructions that are executable by the processing device for causing the processing device to:
receive an indication that the encrypted communication is stored in the memory location; and
based on the indication:
retrieve the encrypted communication from the memory location;
determine that the encrypted communication was authenticated by the hypervisor application; and
decrypt the encrypted communication using the first key to determine the decrypted version of the encrypted communication.

8. The system of claim 1, wherein the processing device and the non-volatile memory device are included in a cloud-computing environment and the remote device is external to the cloud-computing environment.

9. A method comprising:
   storing, by a processing device, encrypted data on a non-volatile memory device; and
   subsequent to storing the encrypted data on the non-volatile memory device:
      receiving, by the processing device, an encrypted communication from a remote device;
      decrypting, by the processing device, the encrypted communication using a first key stored in an internal memory of the processing device to generate a decrypted version of the encrypted communication;
      extracting, by the processing device and from the decrypted version of the encrypted communication, a second key that is different from the first key; and
      decrypting, by the processing device, the encrypted data stored on the non-volatile memory device using the second key.

10. The method of claim 9, wherein the non-volatile memory device is a persistent memory device, the first key is a private key, and the encrypted communication is encrypted using a public key associated with the private key.

11. The method of claim 9, further comprising:
   storing the second key in a memory location that is accessible by a software application; and
   causing the software application to use the second key to decrypt the encrypted data.

12. The method of claim 9, further comprising:
   determining that the processing device is in an operational mode associated with encrypting a memory location in a volatile memory device; and
   based on determining that the processing device is in the operational mode, storing the second key in the memory location in an encrypted format.

13. The method of claim 9, further comprising using a hypervisor application for:
   receiving the encrypted communication from the remote device over the Internet;
   determining that the encrypted communication satisfies a predefined criterion;
   based on determining that the encrypted communication satisfies the predefined criterion:
      causing the encrypted communication to be stored in a memory location that is accessible by the processing device and the hypervisor application; and
      indicating to the processing device that the encrypted communication is stored in the memory location.

14. The method of claim 13, further comprising:
   receiving, by the processing device, an indication that the encrypted communication is stored in the memory location; and
   based on the indication:
      retrieving, by the processing device, the encrypted communication from the memory location;
      determining, by the processing device, that the encrypted communication was authenticated by the hypervisor application; and
      decrypting, by the processing device, the encrypted communication using the first key to determine the decrypted version of the encrypted communication.

15. A non-transitory computer readable medium comprising program code executable by a processing device of a computing environment for causing the processing device to:
   receive an encrypted communication from a remote device that is external to the computing environment;
   decrypt the encrypted communication using a first key stored in an internal memory of the processing device to determine a decrypted version of the encrypted communication;
   extract from the decrypted version of the encrypted communication a second key that is different from the first key; and
   decrypt, using the second key, encrypted data stored on a non-volatile memory device of the computing environment, wherein the encrypted data was stored on the non-volatile memory device prior to the processing device receiving the encrypted communication from the remote device.

16. The non-transitory computer readable medium of claim 15, wherein the non-volatile memory device is a persistent memory device, the first key is a private key, and the encrypted communication is encrypted using a public key associated with the private key.

17. The non-transitory computer readable medium of claim 15, further comprising instructions executable by the processing device for causing the processing device to:
   store the second key in a memory location that is accessible by a software application; and
   cause the software application to use the second key to decrypt the encrypted data.

18. The non-transitory computer readable medium of claim 15, further comprising instructions executable by the processing device for causing the processing device to:
   determine if the processing device is in an operational mode associated with encrypting a memory location in a volatile memory device;
   based on determining that the processing device is in the operational mode, store the second key in the memory location in an encrypted format; and
   based on determining that the processing device is not in the operational mode, wait until the processing device has entered the operational mode to store the second key in the memory location.

19. The non-transitory computer readable medium of claim 15, further comprising instructions executable by the processing device for causing the processing device to:
   receive the encrypted communication from the remote device over the Internet;
   determine if the encrypted communication satisfies a predefined criterion;
   based on determining that the encrypted communication satisfies the predefined criterion:
      cause the encrypted communication to be stored in a memory location that is accessible to a hypervisor application; and
   based on determining that the encrypted communication does not meet the predefined criterion, discard the encrypted communication.

20. The non-transitory computer readable medium of claim 19, further comprising instructions executable by the processing device for causing the processing device to:
   receive an indication that the encrypted communication is stored in the memory location; and
   based on the indication:
      retrieve the encrypted communication from the memory location;
      determine that the encrypted communication was authenticated by the hypervisor application; and
      decrypt the encrypted communication using the first key to determine the decrypted version of the encrypted communication.

21. The non-transitory computer readable medium of claim 15, further comprising instructions executable by the processing device for causing the processing device to:

prior to receiving the encrypted communication from the remote device, receive the encrypted data from the remote device and store the encrypted data on the non-volatile memory device.

\* \* \* \* \*